United States Patent
Lin et al.

(10) Patent No.: US 9,780,705 B2
(45) Date of Patent: Oct. 3, 2017

(54) SINGLE PHASE BRUSHLESS DC MOTOR AND METHOD OF ADJUSTING OUTPUT PHASE THEREOF

(71) Applicant: DELTA ELECTRONICS, INC., Taoyuan (TW)

(72) Inventors: Yi-Fan Lin, Taoyuan (TW);
Chien-Sheng Lin, Taoyuan (TW);
Chung-Hung Tang, Taoyuan (TW);
Chun-Lung Chiu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/004,991

(22) Filed: Jan. 24, 2016

(65) Prior Publication Data
US 2017/0141707 A1    May 18, 2017

(30) Foreign Application Priority Data
Nov. 18, 2015 (CN) .......................... 2015 1 0796992

(51) Int. Cl.
*H02P 6/26* (2016.01)
*H02P 6/16* (2016.01)
*H02P 6/15* (2016.01)

(52) U.S. Cl.
CPC ................ *H02P 6/16* (2013.01); *H02P 6/157* (2016.02); *H02P 6/26* (2016.02)

(58) Field of Classification Search
CPC ...... H02P 6/12; H02P 6/14; H02P 6/15; H02P 6/26; H02P 6/30
USPC .......... 318/400.26, 400.29, 400.39, 293, 294
See application file for complete search history.

(56) References Cited

U.S. PATENT DOCUMENTS

2015/0054437 A1* 2/2015 Oomura .................... H02P 6/28
                                                            318/400.06

* cited by examiner

*Primary Examiner* — Bentsu Ro
(74) *Attorney, Agent, or Firm* — Muncy, Geisler, Olds & Lowe, P.C.

(57) ABSTRACT

A single phase brushless DC motor comprises a Hall effect sensor, a coil assembly and a motor control circuit which generating a driving signal to guide a coil current flowing through the coil assembly. The Hall effect sensor senses the magnetic pole of the rotor to accordingly generate a Hall effect signal. The motor control circuit outputs a current polarity reverse signal according to the voltage at one end of the coil assembly. The time when the current polarity reverse signal is generated corresponds to the polarity reverse time of the coil current. The motor control circuit adjusts the phase of the driving signal according to the polarity reverse time of the Hall effect signal and the time when the current polarity reverse signal is generated to synchronize the phase of the back emf of the single phase brushless DC motor with the phase of the coil current.

9 Claims, 7 Drawing Sheets

SINGLE PHASE BRUSHLESS DC MOTOR AND METHOD OF ADJUSTING OUTPUT PHASE THEREOF

CROSS REFERENCE TO RELATED APPLICATIONS

This Non-provisional application claims priority under 35 U.S.C. §119(a) on Patent Application No(s). 201510796992.8 filed in People's Republic of China on Nov. 18, 2015, the entire contents of which are hereby incorporated by reference

BACKGROUND

Technical Field

The invention relates to a motor and a method of adjusting the output phase thereof, in particular to a single phase brushless DC motor and a method of adjusting the output phase thereof.

Related Art

In a single phase brushless DC motor system, phase difference between the current flowing through the coil and the motor back emf causes reactive power problem. Thus, the motor can not operate efficiently and consumes wasteful energy.

SUMMARY

A single phase brushless DC motor comprises a Hall effect sensor, a coil assembly and a motor control circuit. The Hall effect sensor senses a position of the magnetic pole of a rotor of the motor to accordingly generate a Hall effect signal. The motor control circuit comprises a coil switching unit, a driving unit, a coil voltage converting unit, a reverse current polarity detection unit, a phase error detection unit, a phase control unit and a logic unit. The coil switching unit is coupled to the coil assembly. The driving unit generates a driving signal to drive the coil switching unit to guide a coil current flowing through the coil assembly. The coil voltage converting unit is coupled to the coil assembly and the coil switching unit and detects the voltage at one end of the coil assembly to accordingly output a phase voltage transition signal. The reverse current polarity detection unit receives the phase voltage transition signal to accordingly output a current polarity reverse signal. The time when the current polarity reverse signal is generated corresponds to the polarity reverse time of the coil current. The phase error detection unit receives the Hall effect signal and the current polarity reverse signal, and outputs a phase error signal according to the time interval between the polarity reverse time of the Hall effect signal and the time when the current polarity reverse signal is generated. The phase control unit receives the Hall effect signal and the phase error signal to accordingly output a phase compensation commutation signal. The logic unit receives the phase compensation commutation signal to accordingly adjust the phase of the driving signal to synchronize the phase of the back emf of the single phase brushless DC motor with the phase of the coil current.

In one embodiment, the coil switching unit comprises a first switching element, a second switching element, a third switching element and a fourth switching element, a first end of the coil assembly is coupled to the first switching element and the third switching element, a second end of the coil assembly is coupled to the second switching element and the fourth switching element.

In one embodiment, the reverse current polarity detection unit receives the phase voltage transition signal related to the voltage detected at the second end and outputted by the coil voltage converting unit to accordingly output the current polarity reverse signal when the driving signal controls the first switching element to be cut off, the second switching element to conduct, the third switching element to conduct and the fourth switching element to be cut off and the second switching element receives a PWM signal out of the duty cycle.

In one embodiment, the reverse current polarity detection unit receives the phase voltage transition signal related to the voltage detected at the first end and outputted by the coil voltage converting unit to accordingly output the current polarity reverse signal when the driving signal controls the first switching element to conduct, the second switching element to be cut off, the third switching element to be cut off and the fourth switching element to conduct, and the first switching element receives a PWM signal out of the duty cycle.

In one embodiment, the reverse current polarity detection unit receives the phase voltage transition signal related to the voltage detected at the first end and outputted by the coil voltage converting unit to accordingly output the current polarity reverse signal when the driving signal controls the first switching element to be cut off, the second switching element to conduct, the third switching element to conduct and the fourth switching element to be cut off, and the third switching element receives a PWM signal out of the duty cycle.

In one embodiment, the reverse current polarity detection unit receives the phase voltage transition signal related to the voltage detected at the second end and outputted by the coil voltage converting unit to accordingly output the current polarity reverse signal when the driving signal controls the first switching element to conduct, the second switching element to be cut off, the third switching element to be cut off and the fourth switching element to conduct, and the fourth switching element receives a PWM signal out of the duty cycle.

In one embodiment, the motor control circuit further comprises a compensation adjusting unit coupled between the phase error detection unit and the phase control unit, and the compensation adjusting unit receives the phase error signal to accordingly adjust the compensation magnitude for the phase compensation commutation signal of the phase control unit.

In one embodiment, a method of adjusting output phase of motor for a single phase brushless DC motor is applied to a single phase brushless DC motor which comprises a coil assembly, a Hall effect sensor and a motor control circuit. The motor control circuit comprises a coil switching unit, the coil switching unit is coupled to the coil assembly and receives a driving signal to guide a coil current flowing through the coil assembly. The method comprises: sensing a position of the magnetic pole of the rotor of the single phase brushless DC motor to generate a Hall effect signal by the Hall effect sensor; generating a current polarity reverse signal according to the voltage at one end of the coil assembly by the motor control circuit; and adjusting the phase of the driving signal according to the time interval between the polarity reverse time of the Hall effect signal and the time when the current polarity reverse signal is generated by the motor control circuit to synchronize the phase of the back emf of the single phase brushless DC motor with the phase of the coil current.

In one embodiment, the step of adjusting the phase of the driving signal comprises: determining whether the polarity reverse time of the Hall effect signal lags the time when the current polarity reverse signal is generated by the motor control circuit; accordingly advancing the phase of the driving signal by the motor control circuit if the polarity reverse time of the Hall effect signal is earlier than the time when the current polarity reverse signal is generated; and accordingly delaying the phase of the driving signal by the motor control circuit if the polarity reverse time of the Hall effect signal is later than the time when the current polarity reverse signal is generated.

In summary, the single phase brushless DC motor and method of adjusting output phase thereof determine the phase of the coil current by detecting the voltage variation at one end of the coil assembly. In comparison with the conventional manner that determines the phase of the coil current by detecting the current variation of the current detection unit and the coil assembly in series, the disclosure does not need extra unnecessary elements and avoids the problems that the energy loss and overheating on the conventional current detection unit due to the coil current through it and the impact on the operation of the motor.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
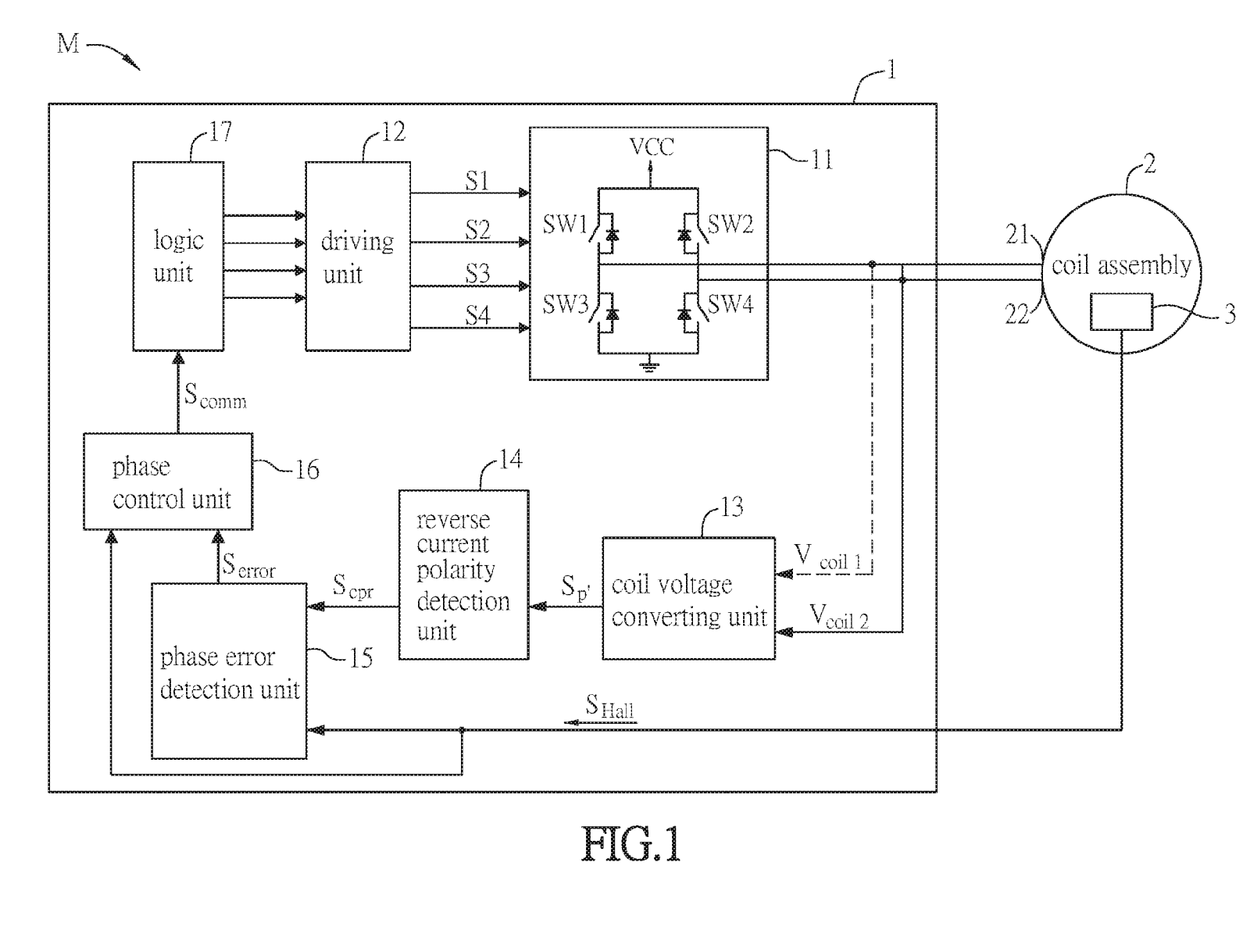
FIG. 1 is a block diagram of a single phase brushless DC motor according to an embodiment.
Figure 3:
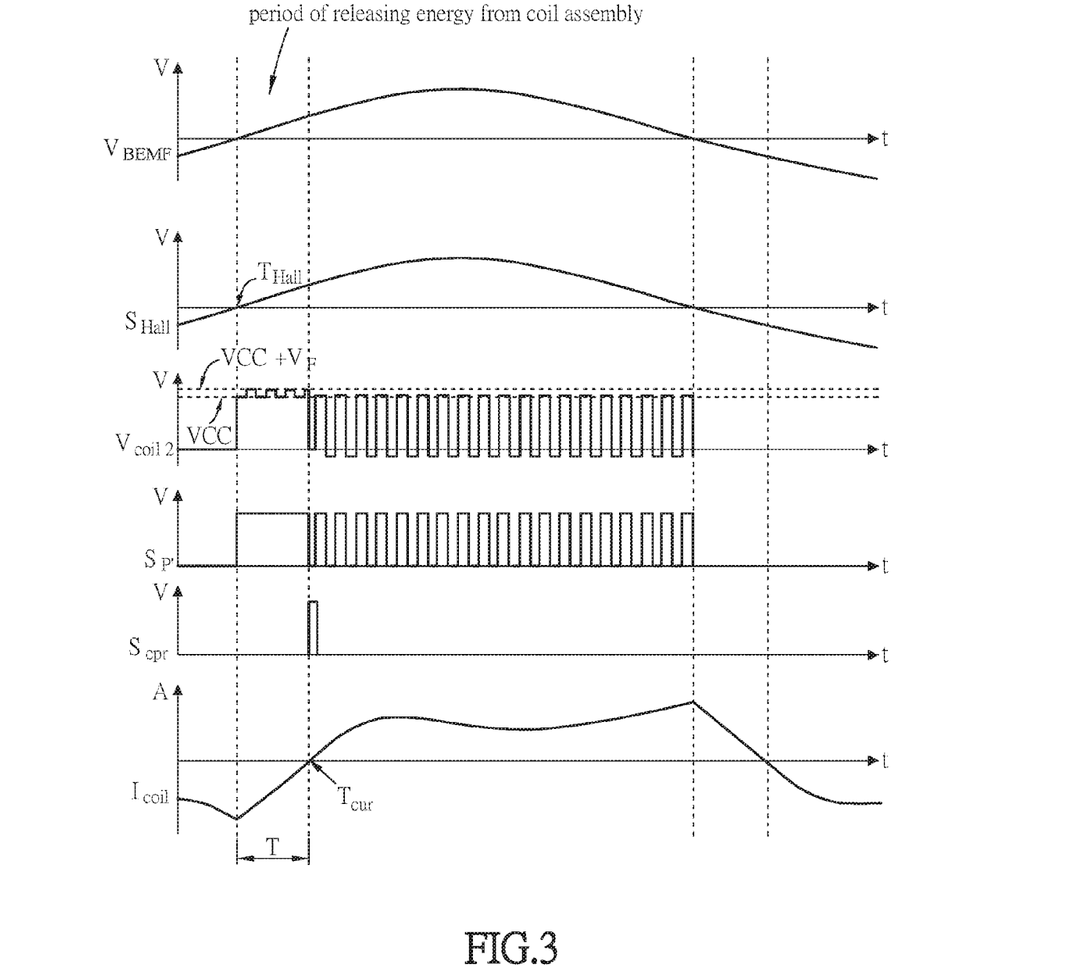
FIG. 3 is a schematic diagram showing lag relationship between the coil current and the coil voltage.

FIG. 1 is a block diagram of a single phase brushless DC motor according to an embodiment. Referring to FIG. 1, the motor M is a single phase brushless DC motor comprising a stator and a rotor. The rotor comprises a motor control circuit 1, a coil assembly 2 and a Hall effect sensor 3. The motor control circuit 1 is coupled to the coil assembly 2 and guides a coil current $I_{coil}$ flowing through the coil assembly 2, so the coil assembly 2 generates a magnetic field to rotate the rotor of the motor M. The Hall effect sensor 3 senses a position of the magnetic pole of the rotor of the motor M to accordingly generate a Hall effect signal $S_{Hall}$. The Hall effect sensor 3 should be placed at a proper location, so when reversing the polarity of the motor back emf $V_{BEMF}$, the polarity of the Hall effect signal $S_{Hall}$ also accordingly changes The waveforms of the motor back emf $V_{BEMF}$ and the Hall effect signal $S_{Hall}$ are shown in FIG. 3.

The motor control circuit 1 comprises a coil switching unit 11, a driving unit 12, a coil voltage converting unit 13, a reverse current polarity detection unit 14, a phase error detection unit 15, a phase control unit 16 and a logic unit 17.

The coil switching unit 11 is coupled to the coil assembly 2. Furthermore, in the embodiment, the coil switching unit 11 comprises four switching elements which are the first switching element SW1, the second switching element SW2, the third switching element SW3 and the fourth switching element SW4. Two ends of the first switching element SW1 are respectively connected to one end of the second switching element SW2 and one end of the third switching element SW3. The other end of the second switching element SW2 is connected to one end of the fourth switching element SW4. The other end of the third switching element SW3 is connected to the other end of the fourth switching element SW4 and ground. A first end 21 of the coil assembly 2 is coupled to the first switching element SW1 and the third switching element SW3. A second end 22 of the coil assembly 2 is coupled to the second switching element SW2 and the fourth switching element SW4. In the embodiment, the coil switching unit 11 is implemented with a full-bridge circuit for example. The upper portion of the full-bridge circuit (the first switching element SW1 and the second switching element SW2) is implemented with PMOS, the lower portion (the third switching element SW3 and the fourth switching element SW4) is implemented with NMOS. The signal for conducting (turning on) PMOS can be low level voltage, and the signal for conducting (turning on) NMOS can be high level voltage. Alternatively, this unit may be implemented with a half-bridge circuit or a three-phase circuit, and it is not limited thereto. Moreover, each switching element may be a transistor for example MOS, BJT or their combination. The coil assembly 2 may be for example but not limited to a single coil, or multiple coils in series or in parallel or in series/parallel combination.

The driving unit 12 generates a driving signal to drive the coil switching unit 11 to guide the coil current $I_{coil}$ flowing through the coil assembly 2. The driving signal includes switching signals for controlling (e.g. turning on/off) respective switching elements, namely a switching signal S1 for controlling the first switching element SW1, a switching signal S2 for controlling the second switching element SW2, a switching signal S3 for controlling the third switching element SW3, and a switching signal S4 for controlling the fourth switching element SW4. When the driving signal controls the first switching element SW1 and the fourth switching element SW4 to conduct (on) and controls the second switching element SW2 and the third switching element SW3 to be cut off (off), the coil current $I_{coil}$ flows from the first end 21 of the coil assembly 2 through the coil assembly 2 to the second end 22. Similarly, when the driving signal controls the second switching element SW2 and the third switching element SW3 to conduct (on) and controls the first switching element SW1 and the fourth switching element SW4 to be cut off (off), the coil current $I_{coil}$ flows from the second end 22 of the coil assembly 2 through the coil assembly 2 to the first end 21. Thus, by driving the coil switching unit 11 with the driving signal, the flow direction of the coil current $I_{coil}$ changes and the direction of the magnetic field of the coil assembly 2 also changes so the rotor of the motor M rotates.

In the embodiment, when the driving signal controls the first switching element SW1 and the fourth switching element SW4 to conduct (on), the driving unit 12 also controls the conducting cycle of the first switching element SW1 with a PWM (pulse width modulation) signal. In other words, in the conducting period of the first switching element SW1 and the fourth switching element SW4, the first switching element SW1 further operates with PWM duty cycle of alternate on/off. Similarly, when the second switching element SW2 and the third switching element SW3 are conducting (in on-state), the second switching element SW2 also receives the PWM signal from the driving unit 12 and accordingly operates with PWM duty cycle of alternate on/off.

Figure 2:
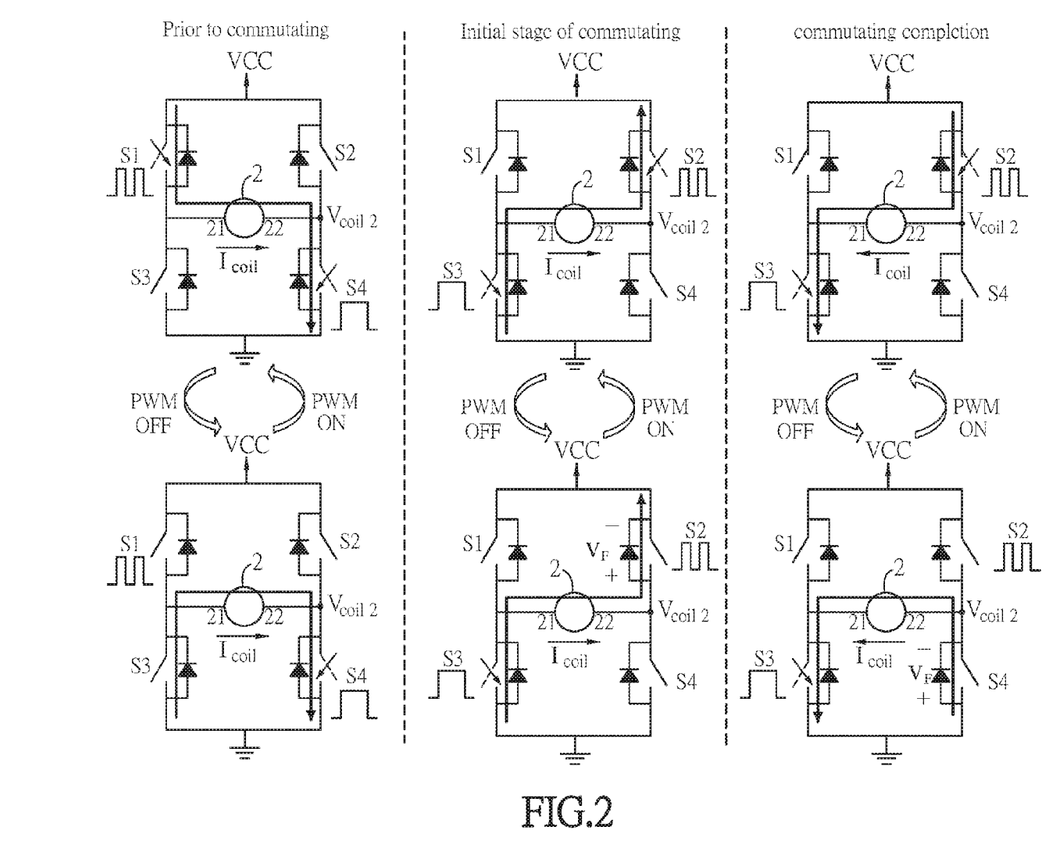
FIG. 2 is a schematic diagram showing the current path in commutation of the coil current.

FIG. 2 is a schematic diagram showing the current path in commutation of the coil current. FIG. 3 is a schematic diagram showing lag relationship between the coil current and the coil voltage. For clearly illustrating the flowing variation of the current $I_{coil}$, FIG. 2 shows the on/off states of each switching element of the switching unit 11 at six statuses. FIG. 2 is divided into left region for stage prior to commutating, middle region for initial stage of commutating, and right region for commutating completion stage in terms of the coil current $I_{coil}$. Based on the PWM control of the high-side of the previous mentioned coil switching unit 11 (i.e. the first switching element SW1 and the second switching element SW2), each stage further contains high-side conduction (PWM on) status and high-side cutoff (PWM off) status. Besides, FIG. 3 top-down shows the waveforms of the motor back emf $V_{BEMF}$, the Hall effect signal $S_{Hall}$, the coil voltage $V_{coil2}$ at the second end 22 of the coil assembly 2, the phase voltage transition signal $S_{pt}$, the current polarity reverse signal $S_{cpr}$ and the coil current $I_{coil}$.

Referring to FIG. 2 and FIG. 3, the coil voltage converting unit 13 is coupled to the coil assembly 2 and the coil switching unit 11, and detects the voltage at one end of the coil assembly 2 to accordingly output a phase voltage transition signal $S_{pt}$. In the embodiment, the coil voltage converting unit 13 detects the voltage (the coil voltage $V_{coil2}$) at the second end 22 of the coil assembly 2. Furthermore, when the first switching element SW1 and the fourth switching element SW4 are conducting (On) and the second switching element SW2 and the third switching element SW3 are cut off (Off) and the PWM signal controls the first switching element SW1 to conduct (PWM=Low level), the coil current $I_{coil}$ flows through the high voltage VCC the first switching element SW1, the coil assembly 2, the fourth switching element SW4 in sequence to ground. Thus, the coil current $I_{coil}$ flows from the first end 21 of the coil assembly 2 through the coil assembly 2 to the second end 22. At this time, the coil voltage $V_{coil2}$ is grounded through the fourth switching element SW4 and becomes 0V. Then, when the PWM signal controls the first switching element SW1 to be cut off (PWM=High level), only the fourth switching element SW4 is conducting and others are cut off in the coil switching unit 11 so the coil assembly 2 becomes a current source for releasing energy due to its inductance characteristic. Thus, the parasitic freewheeling diode of the third switching element SW3, the fourth switching element SW4 and the coil assembly 2 form a closed loop, so the coil current $I_{coil}$ flows from the coil assembly 2 through the fourth switching element SW4 and the freewheeling diode in sequence and returns to the coil assembly 2. Thus, the coil current $I_{coil}$ still keeps flowing from the first end 21 through the coil assembly 2 to the second end 22. At this time, the coil voltage $V_{coil2}$ is still grounded through the fourth switching element SW4 and keep its voltage level 0.

Then, in the initial stage of commutating in FIG. 2, when the coil switching unit 11 enters the commutation stage, namely the first switching element SW1 and the fourth switching element SW4 are cut off, and the second switching element SW2 and the third switching element SW3 are conducting. At this time, relying on inductance characteristic, the coil assembly 2 needs to release energy completely and then the coil current $I_{coil}$ can reverse. Thus, the coil assembly 2 forms a current source. When the PWM signal controls the second switching element SW2 to conduct (PWM=Low level), the coil current $I_{coil}$ flows from ground through the third switching element SW3, the coil assembly 2, the second switching element SW2 in sequence to the high voltage VCC. Thus, the coil current $I_{coil}$ flows from the first end 21 of the coil assembly 2 through the coil assembly 2 to the second end 22 and keeps its original flow direction. Meanwhile, the coil voltage $V_{coil2}$ is guided to the high voltage by the second switching element SW2 and its voltage level becomes VCC. Then, when the PWM signal controls the second switching element SW2 to be cut off (PWM=High level), the coil current $I_{coil}$ does not flow through the second switching element SW2. Instead, it flows through the parasitic freewheeling diode of the second switching element SW2 to the high voltage VCC. At this time, the coil voltage $V_{coil2}$ is guided to the high voltage through the freewheeling diode, so its voltage level is the sum of VCC and the applied voltage $V_F$ of the freewheeling diode (i.e. VCC+$V_F$).

Thus, after the coil assembly 2 completes releasing energy, the coil current $I_{coil}$ flows from the high voltage VCC through the second switching element SW2, the coil assembly 2, the third switching element SW3 in sequence to ground. At this time, the coil current $I_{coil}$ has completed commutating so the coil assembly 2 generates a magnetic field of opposite direction to drive the rotor to rotate. Similarly, the PWM signal still continues controlling on/off stage of the second switching element SW2. Furthermore, when the PWM signal controls the second switching element SW2 to conduct (PWM=Low level), the coil voltage $V_{coil2}$ is guided to the high voltage VCC by the second switching element SW2 so its voltage level becomes VCC. When the PWM signal controls the second switching element SW2 to be cut off (PWM=High level), the coil assembly 2 becomes a current source due to releasing energy. Accordingly, the coil current $I_{coil}$ flows from the coil assembly 2 through the third switching element SW3, the parasitic freewheeling diode of the fourth switching element SW4 in sequence and then returns to the coil assembly 2. At this time, the voltage level of the coil voltage $V_{coil2}$ is equal to the applied voltage $-V_F$ from the cathode to the anode of the freewheeling diode.

On the whole, as shown in FIG. 3, the voltage level of the coil voltage $V_{coil2}$ keeps low (0 V) prior to commutating, keeps high (VCC and VCC+$V_F$) at the initial stage of commutating (period of releasing energy from the coil assembly 2), and becomes alternate high and low voltage levels (VCC and $-V_F$) during commutating completion. Namely, when the coil voltage $V_{coil2}$ changes from long-term low voltage level into high voltage level, it is determined that the motor M enters the commutation stage. In the initial stage of commutating, the coil voltage $V_{coil2}$ still keeps high. If the coil voltage $V_{coil2}$ descends to low voltage level, the coil assembly 2 completes releasing energy, the phase the coil current $I_{coil}$ begins here and the coil voltage $V_{coil2}$ has been commutated. Therefore, according to the voltage variation of the coil voltage $V_{coil2}$, it can be determined that the coil current $I_{coil}$ has been commutated when the coil voltage $V_{coil2}$ descends to $-V_F$. Here, the coil voltage converting unit 13 outputs the phase voltage transition signal $S_{p'}$ based on the detected coil voltage $V_{coil2}$. The phase voltage transition signal $S_{p'}$ is a voltage signal readable for micro-controller, it is correspondingly outputted at high level (high) if the coil voltage $V_{coil2}$ is at high voltage level (VCC or VCC+$V_F$), and it is correspondingly outputted at low level (low) if at low voltage level (0 or $-V_F$). The corresponding waveforms are shown in FIG. 3.

Therefore, the reverse current polarity detection unit 14 receives the phase voltage transition signal $S_{p'}$ to accordingly output a current polarity reverse signal $S_{cpr}$. The time when the current polarity reverse signal $S_{cpr}$ is generated corresponds to the polarity reverse time of the coil current $I_{coil}$, namely the moment just completing commutating. The waveform of the current polarity reverse signal $S_{cpr}$ can refer to FIG. 3. In the embodiment, the reverse current polarity detection unit 14 can be configured to output the current polarity reverse signal $S_{cpr}$ if detecting that the phase voltage transition signal $S_{p'}$ changes from long-term high voltage level into low voltage level.

The phase error detection unit 15 receives the Hall effect signal $S_{Hall}$ and the current polarity reverse signal $S_{cpr}$ to output a phase error signal $S_{error}$ according to the time interval T between the polarity reverse time $T_{Hall}$ of the Hall effect signal $S_{Hall}$ and the time $T_{cur}$ when the current polarity reverse signal $S_{cpr}$ is generated. Furthermore, the Hall effect signal $S_{Hall}$ corresponds to the motor back emf $V_{BEMF}$, so the polarity reverse time $T_{Hall}$ can also represent the polarity reverse time of the motor back emf $V_{BEMF}$, and the time $T_{cur}$ when the current polarity reverse signal $S_{cpr}$ is generated corresponds to the commutating time of the coil current $I_{coil}$. Thus, the time interval T can represent the phase difference between the motor back emf $V_{BEMF}$ and the coil current $I_{coil}$. Moreover, the phase error signal $S_{error}$ further possesses the information about the order of the polarity reverse time $T_{Hall}$ and the time $T_{cur}$ when the current polarity reverse signal $S_{cpr}$.

The phase control unit 16 receives the Hall effect signal $S_{Hall}$ and the phase error signal $S_{error}$ to accordingly output a phase compensation commutation signal $S_{comm}$. In the embodiment, the phase control unit 16 takes the polarity reverse time $T_{Hall}$ of the Hall effect signal $S_{Hall}$ as a reference point for adjusting phase, and determines the magnitude and direction of the phase compensation according to the phase error signal $S_{error}$. For example, when the phase difference (namely the time interval T) is 150 μS and the polarity reverse time $T_{Hall}$ of the Hall effect signal $S_{Hall}$ is earlier than the time $T_{cur}$ when the current polarity reverse signal $S_{cpr}$ is generated, the phase compensation commutation signal $S_{comm}$ possesses compensation information for adjusting the phase of the coil current $I_{coil}$ with 150 μS advance.

Finally, the logic unit 17 receives the phase compensation commutation signal $S_{comm}$ to accordingly adjust the phase of the driving signal (for example advancing or delaying) to control the duty cycle of each switching element of the coil switching unit 11 so as to synchronize the phase of motor back emf $V_{BEMF}$ with the phase the coil current $I_{coil}$. Therefore, in the embodiment, the phase of the coil current $I_{coil}$ is determined by detecting the voltage variation at one end of the coil assembly 2. In comparison with the conventional manner that determines the phase of the coil current by detecting the current variation of the current detection unit and the coil assembly in series, the embodiment does not need extra unnecessary elements and avoids the problems that the energy loss and overheating on the conventional current detection unit due to the coil current $I_{coil}$ through it and the impact on the operation of the motor M.

Figure 4:
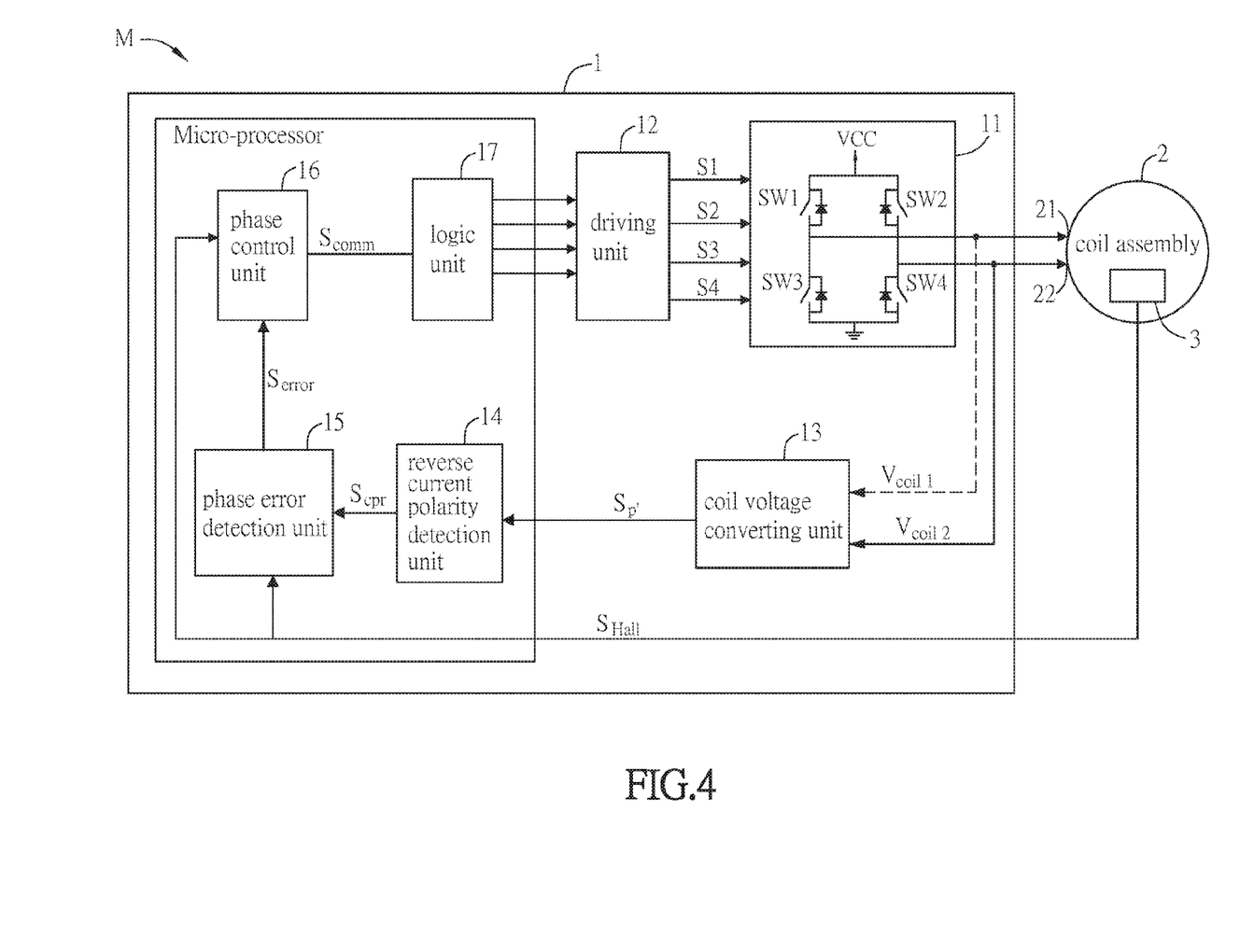
FIG. 4 is a block diagram of another single phase brushless DC motor according to an embodiment.

Moreover, in some embodiments as shown in FIG. 4, the reverse current polarity detection unit 14, the phase error detection unit 15, the phase control unit 16 and the logic unit 17 may be integrated into a micro-processor to implement their function. The micro-processor may for example but not limited to be replaced with a MCU, a programmable logic array (FPGA or CPLD) or an ASIC.

Moreover, the above embodiments are illustrated under the configuration that the high-side is controlled by PWM and the coil voltage $V_{coil2}$ at the second end 22 of the coil assembly 2 is detected. In other embodiment, the phase of the coil current $I_{coil}$ can be determined by detecting the coil voltage $V_{coil1}$ at the first end 21 of the coil assembly 2. For example, the reverse current polarity detection unit 14 receives the phase voltage transition signal $S_{p'}$ related to the voltage detected at the first end 21 of the coil assembly 2 and outputted by the coil voltage converting unit 13 to accordingly output the current polarity reverse signal $S_{cpr}$ when the driving signal controls the first switching element SW1 to conduct (on), the second switching element SW2 to be cut off (off), the third switching element SW3 to be cut off (off) and the fourth switching element SW4 to conduct (on) and the first switching element SW1 receives the PWM signal out of the duty cycle (i.e. high-side cutoff, PWM=high level). Thus, the phase of the coil current $I_{coil}$ can be detected.

In other embodiments, the phase of the coil current $I_{coil}$ can be determined by PWM control at low-side, either. For example, the reverse current polarity detection unit 14 receives the phase voltage transition signal $S_{p'}$ related to the voltage detected at the first end 21 of the coil assembly 2 and outputted by the coil voltage converting unit 13 to accordingly output the current polarity reverse signal $S_{cpr}$ when the driving signal controls the first switching element SW1 to be cut off (off), the second switching element SW2 to conduct (on), the third switching element SW3 to conduct (on) and the fourth switching element SW4 to be cut off (off), and the third switching element SW3 receives the PWM signal out of the duty cycle (i.e. low-side cutoff, PWM=low level). Alternatively, the reverse current polarity detection unit 14 receives the phase voltage transition signal $S_{p'}$ of the coil assembly 2 related to the voltage detected at the second end 22 of the coil assembly 2 and outputted by the coil voltage converting unit 13 to accordingly output the current polarity reverse signal $S_{cpr}$ when the driving signal controls the first switching element SW1 to conduct (on), the second switching element SW2 to be cut off (off), the third switching element SW3 to be cut off (off) and the fourth switching element SW4 to conduct (on), and the fourth switching element SW4 receives the PWM signal out of the duty cycle (low-side cutoff, PWM=low level).

It is not necessary to perform the previously mentioned determination and compensation for phase error at all times. The determination and compensation for phase error may be performed periodically for example every 10 minutes, every 1 hour, or at the time that the rotating speed of the motor M changes for example performing the determination and compensation for phase error once when raising the rotating speed. Moreover, the coil voltage converting unit 13 may for example but not limited to detect only one end (the first end 21 or the second end 22) of the coil assembly 2, or detect both ends of the coil assembly 2.

Figure 5:
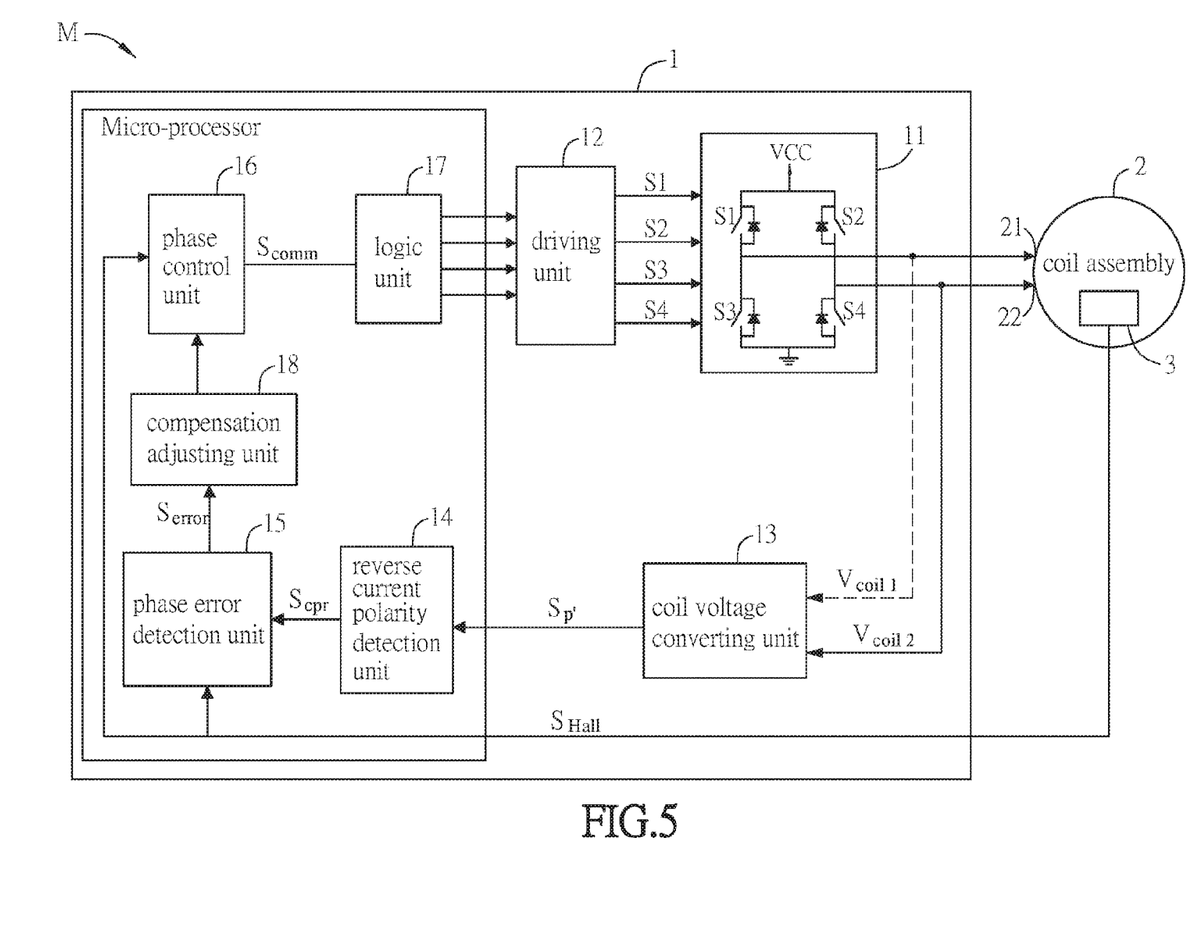
FIG. 5 is a block diagram of another single phase brushless DC motor according to an embodiment.

Referring to FIG. 5, it is a block diagram of another single phase brushless DC motor according to an embodiment. In the embodiment, the motor control circuit 1 further comprises a compensation adjusting unit 18 coupled between the phase error detection unit 15 and the phase control unit 16.

The compensation adjusting unit 18 receives the phase error signal $S_{error}$ to accordingly adjust the compensation magnitude for the phase compensation commutation signal $S_{comm}$ of the phase control unit 16. Namely, in the previous embodiment, the magnitude of phase compensation is a fixed value for compensation, so each time the phase is adjusted with a fixed magnitude until in phase. But in this embodiment, the compensation adjusting unit 18 can adjust the magnitude of phase compensation. For example, it may greatly adjust the phase first and then slightly adjust it later. This may be implemented with PI control (Proportional-Integral Control). Thus, it is faster to synchronize the phases of the coil current $I_{coil}$ and the motor back emf $V_{BEMF}$.

Figure 6A:
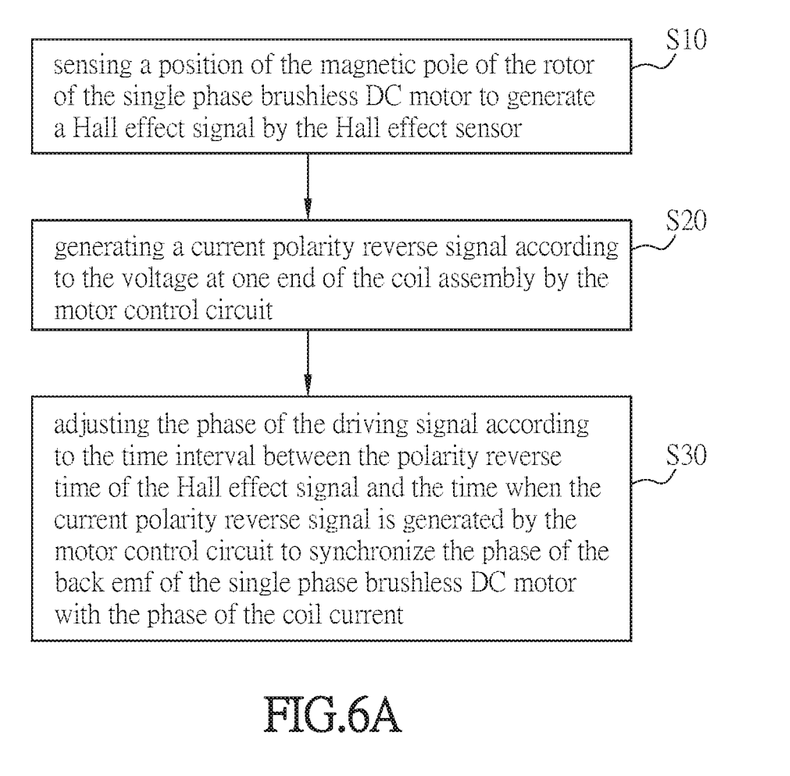
FIG. 6A is a flow chart showing steps of the method of adjusting output phase of motor according to an embodiment.

FIG. 6A is a flow chart showing steps of the method of adjusting output phase of motor according to an embodiment. Referring to FIG. 6A, the method of adjusting output phase of motor according to the embodiment can be applied to the previously mentioned motor M. Because the composition and relationship of the motor M are illustrated previously, they are not repeated here. The method comprises: sensing a position of the magnetic pole of the rotor of the motor to generate a Hall effect signal by the Hall effect sensor (S10); generating a current polarity reverse signal according to the voltage at one end of the coil assembly by the motor control circuit (S20); and adjusting the phase of the driving signal according to the time interval between the polarity reverse time of the Hall effect signal and the time when the current polarity reverse signal is generated by the motor control circuit to synchronize the phase of the motor back emf with the phase of the coil current (S30). Because the related explanation and description of the adjusting method are illustrated in the previous embodiments, they are not repeated here.

Figure 6B:
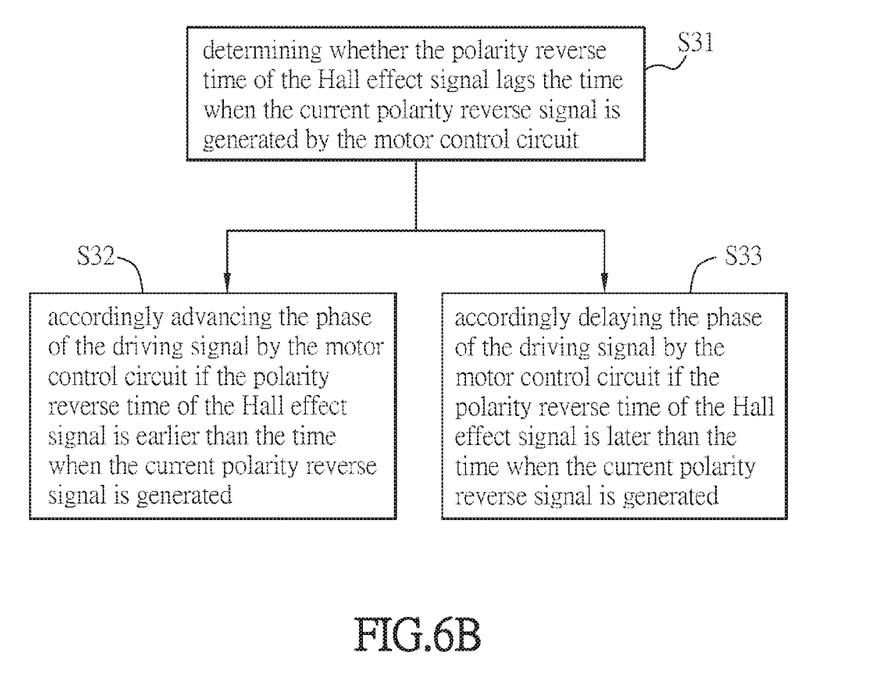
FIG. 6B is a flow chart showing other steps of the method in FIG. 6A.

Moreover, referring to FIG. 6A and FIG. 6B, step S30 comprises: determining whether the polarity reverse time of the Hall effect signal lags the time when the current polarity reverse signal is generated by the motor control circuit (S31); accordingly advancing the phase of the driving signal by the motor control circuit if the polarity reverse time of the Hall effect signal is earlier than the time when the current polarity reverse signal is generated (S32); and accordingly delaying the phase of the driving signal by the motor control circuit if the polarity reverse time of the Hall effect signal is later than the time when the current polarity reverse signal is generated (S33).

In summary, the single phase brushless DC motor and method of adjusting output phase thereof determine the phase of the coil current by detecting the voltage variation at one end of the coil assembly. In comparison with the conventional manner that determines the phase of the coil current by detecting the current variation of the current detection unit and the coil assembly in series, the disclosure does not need extra unnecessary elements and avoids the problems that the energy loss and overheating on the conventional current detection unit due to the coil current through it and the impact on the operation of the motor.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A single phase brushless DC motor, comprising:
   a Hall effect sensor sensing a position of the magnetic pole of a rotor of the motor to accordingly generate a Hall effect signal;
   a coil assembly; and
   a motor control circuit comprising:
   a coil switching unit coupled to the coil assembly;
   a driving unit generating a driving signal to drive the coil switching unit to guide a coil current flowing through the coil assembly;
   a coil voltage converting unit coupled to the coil assembly and the coil switching unit and detecting the voltage at one end of the coil assembly to accordingly output a phase voltage transition signal;
   a reverse current polarity detection unit receiving the phase voltage transition signal to accordingly output a current polarity reverse signal, wherein the time when the current polarity reverse signal is generated corresponds to the polarity reverse time of the coil current;
   a phase error detection unit receiving the Hall effect signal and the current polarity reverse signal, and outputting a phase error signal according to the time interval between the polarity reverse time of the Hall effect signal and the time when the current polarity reverse signal is generated;
   a phase control unit receiving the Hall effect signal and the phase error signal to accordingly output a phase compensation commutation signal; and
   a logic unit receiving the phase compensation commutation signal to accordingly adjust the phase of the driving signal to synchronize the phase of the back emf of the single phase brushless DC motor with the phase of the coil current.

2. The motor of claim 1, wherein the coil switching unit comprises a first switching element, a second switching element, a third switching element and a fourth switching element, a first end of the coil assembly is coupled to the first switching element and the third switching element, a second end of the coil assembly is coupled to the second switching element and the fourth switching element.

3. The motor of claim 2, wherein the reverse current polarity detection unit receives the phase voltage transition signal related to the voltage detected at the second end and outputted by the coil voltage converting unit to accordingly output the current polarity reverse signal when the driving signal controls the first switching element to be cut off, the second switching element to conduct, the third switching element to conduct and the fourth switching element to be cut off and the second switching element receives a PWM signal out of the duty cycle.

4. The motor of claim 2, wherein the reverse current polarity detection unit receives the phase voltage transition signal related to the voltage detected at the first end and outputted by the coil voltage converting unit to accordingly output the current polarity reverse signal when the driving signal controls the first switching element to conduct, the second switching element to be cut off, the third switching element to be cut off and the fourth switching element to conduct, and the first switching element receives a PWM signal out of the duty cycle.

5. The motor of claim 2, wherein the reverse current polarity detection unit receives the phase voltage transition signal related to the voltage detected at the first end and outputted by the coil voltage converting unit to accordingly output the current polarity reverse signal when the driving signal controls the first switching element to be cut off, the second switching element to conduct, the third switching element to conduct and the fourth switching element to be cut off, and the third switching element receives a PWM signal out of the duty cycle.

6. The motor of claim 2, wherein the reverse current polarity detection unit receives the phase voltage transition signal related to the voltage detected at the second end and outputted by the coil voltage converting unit to accordingly output the current polarity reverse signal when the driving signal controls the first switching element to conduct, the second switching element to be cut off, the third switching element to be cut off and the fourth switching element to conduct, and the fourth switching element receives a PWM signal out of the duty cycle.

7. The motor of claim 1, wherein the motor control circuit further comprises a compensation adjusting unit coupled between the phase error detection unit and the phase control unit, and the compensation adjusting unit receives the phase error signal to accordingly adjust the compensation magnitude for the phase compensation commutation signal of the phase control unit.

8. A method of adjusting output phase of motor for a single phase brushless DC motor, wherein the single phase brushless DC motor comprises a coil assembly, a Hall effect sensor and a motor control circuit, the motor control circuit comprises a coil switching unit, the coil switching unit is coupled to the coil assembly and receives a driving signal to guide a coil current flowing through the coil assembly, comprising:

sensing a position of the magnetic pole of the rotor of the single phase brushless DC motor to generate a Hall effect signal by the Hall effect sensor;

generating a current polarity reverse signal according to a voltage at one end of the coil assembly and the duration of the voltage kept at a high level ranging from VCC to VCC+$V_F$ by the motor control circuit, wherein $V_F$ is an applied voltage of a freewheeling diode; and adjusting a phase of the driving signal according to the time interval between the polarity reverse time of the Hall effect signal and the time when the current polarity reverse signal is generated by the motor control circuit to synchronize a phase of the back emf of the single phase brushless DC motor with a phase of the coil current and synchronize a phase of the current polarity reverse signal with a phase of the Hall effect signal.

9. The method of claim 8, wherein the step of adjusting the phase of the driving signal comprises:

determining whether the polarity reverse time of the Hall effect signal lags the time when the current polarity reverse signal is generated by the motor control circuit;

accordingly advancing the phase of the driving signal by the motor control circuit if the polarity reverse time of the Hall effect signal is earlier than the time when the current polarity reverse signal is generated; and accordingly delaying the phase of the driving signal by the motor control circuit if the polarity reverse time of the Hall effect signal is later than the time when the current polarity reverse signal is generated.

* * * * *